United States Patent
Hu (10) Patent No.: US 9,999,014 B2
(45) Date of Patent: Jun. 12, 2018

(54) METHOD AND SYSTEM FOR CONTROLLING PHASE SYNCHRONIZATION, AND APPARATUS

(71) Applicant: HUAWEI TECHNOLOGIES CO., LTD., Shenzhen, Guangdong (CN)

(72) Inventor: Jun Hu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days. days.

(21) Appl. No.: 15/493,280

(22) Filed: Apr. 21, 2017

(65) Prior Publication Data
US 2017/0223647 A1    Aug. 3, 2017

Related U.S. Application Data

(63) Continuation of application No. PCT/CN2014/089319, filed on Oct. 23, 2014.

(51) Int. Cl.
*H04W 56/00*    (2009.01)
*H04W 24/02*    (2009.01)
(Continued)

(52) U.S. Cl.
CPC .......... *H04W 56/002* (2013.01); *H04L 5/0048* (2013.01); *H04W 24/02* (2013.01); *H04W 88/08* (2013.01)

(58) Field of Classification Search
CPC ... H04W 56/002; H04W 24/02; H04W 88/08; H04L 5/0048
(Continued)

(56) References Cited

U.S. PATENT DOCUMENTS 7,202,716 B1 * 4/2007 Chao .................. H03L 7/07
327/149
7,305,012 B1 * 12/2007 De Angeli ........... H04B 7/2618
370/503
(Continued)

FOREIGN PATENT DOCUMENTS

CN    101478341    7/2009
EP    1845740 A1    10/2007
(Continued)

OTHER PUBLICATIONS

Extended European Search Report dated Sep. 1, 2017 in corresponding European Patent Application No. 14904606.2.
(Continued)

*Primary Examiner* — Hai V Nguyen
(74) *Attorney, Agent, or Firm* — Staas & Halsey LLP (57) ABSTRACT

Embodiments of the present invention relate to a method and a system for controlling phase synchronization, and an apparatus. The method includes: determining a path from a non-reference base station to a preset reference base station, obtaining a first phase difference between every two adjacent base stations on the path, obtaining a second phase difference between the reference base station and the non-reference base station according to the first phase difference, and adjusting a non-reference phase of the non-reference base station to a reference phase of the reference base station according to the second phase difference. According to the method and system for controlling phase synchronization, and the apparatus that are provided in the embodiments of the present invention, in a single-frequency network system, phases of base stations are synchronized without a need to install a GPS antenna, so that system costs are reduced.

10 Claims, 8 Drawing Sheets

(51) Int. Cl.
*H04L 5/00* (2006.01)
*H04W 88/08* (2009.01)

(58) Field of Classification Search
USPC .......................................................... 455/502
See application file for complete search history.

(56) References Cited

U.S. PATENT DOCUMENTS

| | | | | |
|---|---|---|---|---|
| 7,587,017 | B2* | 9/2009 | Smith | H03D 3/248 |
| | | | | 375/356 |
| 7,668,245 | B2* | 2/2010 | Hofmeister | H04H 20/67 |
| | | | | 375/259 |
| 7,821,249 | B2* | 10/2010 | Nose | G01R 25/00 |
| | | | | 324/637 |
| 7,840,228 | B2* | 11/2010 | Suemitsu | H03L 7/08 |
| | | | | 370/350 |
| 7,881,416 | B2* | 2/2011 | Smith | H03D 3/248 |
| | | | | 375/354 |
| 7,925,253 | B2* | 4/2011 | Breit | G01R 29/105 |
| | | | | 455/226.1 |
| 9,655,028 | B2* | 5/2017 | De Benedittis | H04W 12/08 |
| 2002/0151306 | A1* | 10/2002 | Ohtani | H04B 7/022 |
| | | | | 455/436 |
| 2007/0104281 | A1* | 5/2007 | Hofmeister | H04H 20/67 |
| | | | | 375/260 |
| 2008/0008285 | A1* | 1/2008 | Smith | H03D 3/248 |
| | | | | 375/376 |
| 2008/0129615 | A1* | 6/2008 | Breit | G01R 29/105 |
| | | | | 343/703 |
| 2008/0152059 | A1* | 6/2008 | Suemitsu | H03L 7/08 |
| | | | | 375/356 |
| 2009/0146640 | A1* | 6/2009 | Nose | G01R 25/00 |
| | | | | 324/76.77 |
| 2009/0296856 | A1* | 12/2009 | Smith | H03D 3/248 |
| | | | | 375/320 |
| 2010/0207820 | A1* | 8/2010 | Kawano | G01S 11/02 |
| | | | | 342/393 |
| 2011/0121815 | A1* | 5/2011 | Yamamoto | G01R 25/04 |
| | | | | 324/76.77 |
| 2011/0301895 | A1* | 12/2011 | Miyahara | G01R 25/00 |
| | | | | 702/72 |
| 2012/0129497 | A1* | 5/2012 | De Benedittis | H04W 12/08 |
| | | | | 455/411 |
| 2013/0003891 | A1* | 1/2013 | Premakanthan | H04L 27/364 |
| | | | | 375/296 |
| 2014/0335861 | A1* | 11/2014 | De Benedittis | H04W 36/0061 |
| | | | | 455/436 |

FOREIGN PATENT DOCUMENTS

| | | | |
|---|---|---|---|
| WO | WO 00/64091 | 10/2000 | |
| WO | WO 0064091 A2 * | 10/2000 | ........... H04B 7/2668 |
| WO | WO2010054546 | 5/2010 | |

OTHER PUBLICATIONS

International Search Report, dated Jul. 2, 2015, in International Application No. PCT/CN2014/089319 (4 pp.).
*3rd Generation Partnership Project; Technical Specification Group Radio Access Network; Evolved Universal Terrestrial Radio Access (E-UTRA); Requirements for support of radio resource management (Release 12)*, 3GPP TS 36.133 V12.5.0 (Sep. 2014), pp. 1-877.
*3rd Generation Partnership Project; Technical Specification Group Radio Access Network; Evolved Universal Terrestrial Radio Access (E-UTRA); Physical channels and modulation (Release 12)*, 3GPP TS 36.211 V12.3.0 (Sep. 2014), pp. 1-124.
*3rd Generation Partnership Project; Technical Specification Group Radio Access Network; Evolved Universal Terrestrial Radio Access (E-UTRA); Physical layer procedures (Release 12)*, 3GPP TS 36.213 V12.3.0 (Sep. 2014), pp. 1-212.
*3rd Generation Partnership Project; Technical Specification Group Radio Access Network; Evolved Universal Terrestrial Radio Access (E-UTRA); Physical layer; Measurements (Release 12)*, 3GPP TS 36.214 V12.0.0 (Sep. 2014), pp. 1-14.
*3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)*, 3GPP TS 36.300 V12.3.0 (Sep. 2014), pp. 1-215.
*3rd Generation Partnership Project; Technical Specification Group Radio Access Network; Evolved Universal Terrestrial Radio Access (E-UTRA); Radio Resource Control (RRC); Protocol specification (Release 12)*, 3GPP TS 36.331 V12.3.0 (Sep. 2014), pp. 1-378.
International Search Report dated Jul. 2, 2015 in corresponding International Application No. PCT/CN2014/089319.

* cited by examiner

METHOD AND SYSTEM FOR CONTROLLING PHASE SYNCHRONIZATION, AND APPARATUS

CROSS-REFERENCE TO RELATED APPLICATIONS

This application is a continuation of International Patent Application No. PCT/CN2014/089319, filed on Oct. 23, 2014. The disclosures of the aforementioned applications are hereby incorporated by reference in their entireties.

TECHNICAL FIELD

Embodiments of the present invention relate to the wireless communications technologies, and in particular, to a method and a system for controlling phase synchronization, and an apparatus.

BACKGROUND

In a wireless communications system of a single-frequency network, all base stations send same cell signals, and user equipment (UE) on each base station edge may receive wanted signals of multiple base stations at the same time. In this way, better signal quality may be achieved, and a user throughput rate is improved. In a single-frequency network system, phases of base stations in a same cell need to be synchronized.

In the prior art, a Global Positioning System (GPS) is configured on each base station. The base station obtains a current absolute moment by using the GPS, and presets a moment for each base station. For example, 12 o'clock on Jan. 1, 2010 is used as a start moment of a subframe whose system frame number (SFN) is 0 and subframe number is 0 in a cell. Each base station calculates, according to the preset moment and the obtained current absolute moment, an SFN and a subframe number that are of a currently sent frame, so as to synchronize phases of signals between all base stations.

However, in the prior art, a GPS antenna needs to be installed during signal phase synchronization between all base stations. Consequently, costs are relatively high.

SUMMARY

Embodiments of the present invention provide a method and a system for controlling phase synchronization, and an apparatus, so as to resolve a problem of relatively high system costs when phases of stations are synchronized by using a GPS in a single-frequency network system.

According to a first aspect, an embodiment of the present invention provides a method for controlling phase synchronization, including:

determining a path from a non-reference base station to a preset reference base station, and obtaining a first phase difference between every two adjacent base stations on the path;

obtaining a second phase difference between the reference base station and the non-reference base station according to the first phase difference; and adjusting a non-reference phase of the non-reference base station to a reference phase of the reference base station according to the second phase difference.

With reference to the first aspect, in a first possible implementation manner of the first aspect, the obtaining a first phase difference between every two adjacent base stations on the path includes:

setting a first base station in the adjacent base stations on the path to a measurement mode, and obtaining a third phase difference calculated and reported by the first base station according to a measurement reference signal sent by a second base station in the adjacent base stations, where the third phase difference is a phase difference of the second base station relative to the first base station;

setting the second base station to a measurement mode, and obtaining a fourth phase difference calculated and reported by the second base station according to a measurement reference signal sent by the first base station, where the fourth phase difference is a phase difference of the first base station relative to the second base station; and obtaining a first phase difference between the first base station and the second base station according to the third phase difference and the fourth phase difference.

With reference to the first possible implementation manner of the first aspect, in a second possible implementation manner of the first aspect, the method further includes:

obtaining an inter-station phase delay between the first base station and the second base station according to the third phase difference and the fourth phase difference.

With reference to any one of the first aspect, or the first to the second possible implementation manners of the first aspect, in a third possible implementation manner of the first aspect, before the determining a path from a non-reference base station to a preset reference base station, the method further includes:

receiving a first physical cell identifier PCI reported by a base station that in a measurement mode;

allocating a second PCI different from the first PCI to a base station that is in a non-measurement mode; and allocating, according to the second PCI, a different measurement reference signal to the base station that is in a non-measurement mode.

With reference to the second possible implementation manner of the first aspect, in a fourth possible implementation manner of the first aspect, the method further includes:

when a preset period arrives, setting the first base station as a transmit station and setting the second base station as a receive station;

obtaining a fifth phase difference calculated and reported by the receive station according to a measurement reference signal sent by the transmit station, where the fifth phase difference is a phase difference of the transmit station relative to the receive station;

obtaining each sixth phase difference between the transmit station and the receive station according to the fifth phase difference and the inter-station phase delay between the first base station and the second base station;

obtaining a seventh phase difference between the reference base station and the non-reference base station according to each sixth phase difference; and adjusting the non-reference phase of the non-reference base station to the reference phase of the reference base station according to the seventh phase difference.

With reference to either of the third to the fourth possible implementation manners of the first aspect, in a fifth possible implementation manner of the first aspect, the measurement reference signal is obtained by using different combinations of a symbol domain and a subcarrier domain.

According to a second aspect, an embodiment of the present invention provides a central controller, including:

a first obtaining module, configured to: determine a path from a non-reference base station to a preset reference base station, and obtain a first phase difference between every two adjacent base stations on the path;

a second obtaining module, configured to obtain a second phase difference between the reference base station and the non-reference base station according to the first phase difference; and a processing module, configured to adjust a non-reference phase of the non-reference base station to a reference phase of the reference base station according to the second phase difference.

With reference to the second aspect, in a first possible implementation manner of the second aspect, the first obtaining module includes:

a third phase difference obtaining unit, configured to: set a first base station in the adjacent base stations on the path to a measurement mode, and obtain a third phase difference calculated and reported by the first base station according to a measurement reference signal sent by a second base station in the adjacent base stations, where the third phase difference is a phase difference of the second base station relative to the first base station;

a fourth phase difference obtaining unit, configured to: set the second base station to a measurement mode, and obtain a fourth phase difference calculated and reported by the second base station according to a measurement reference signal sent by the first base station, where the fourth phase difference is a phase difference of the first base station relative to the second base station; and a first phase difference obtaining unit, configured to obtain a first phase difference between the first base station and the second base station according to the third phase difference and the fourth phase difference.

With reference to the first possible implementation manner of the second aspect, in a second possible implementation manner of the second aspect, the central controller further includes:

a phase delay obtaining module, configured to obtain an inter-station phase delay between the first base station and the second base station according to the third phase difference and the fourth phase difference.

With reference to any one of the second aspect, or the first to the second possible implementation manners of the second aspect, in a third possible implementation manner of the second aspect, the central controller further includes:

a receiving module, configured to receive a first physical cell identifier PCI reported by a base station that is in a measurement mode;

a PCI allocation module, configured to allocate a second PCI different from the first PCI to a base station that is in a non-measurement mode; and a measurement reference signal allocation module, configured to allocate, according to the second PCI, a different measurement reference signal to the base station that is in a non-measurement mode.

With reference to the second possible implementation manner of the second aspect, in a fourth possible implementation manner of the second aspect, the central controller further includes:

a setting module, configured to: when a preset period arrives, set the first base station as a transmit station and set the second base station as a receive station;

a third obtaining module, configured to obtain a fifth phase difference calculated and reported by the receive station according to a measurement reference signal sent by the transmit station, where the fifth phase difference is a phase difference of the transmit station relative to the receive station;

a fourth obtaining module, configured to obtain each sixth phase difference between the transmit station and the receive station according to the fifth phase difference and the inter-station phase delay between the first base station and the second base station;

a fifth obtaining module, configured to obtain a seventh phase difference between the reference base station and the non-reference base station according to each sixth phase difference; and an adjustment module, configured to adjust the non-reference phase of the non-reference base station to the reference phase of the reference base station according to the seventh phase difference.

With reference to either of the third to the fourth possible implementation manners of the second aspect, in a fifth possible implementation manner of the second aspect, the measurement reference signal is obtained by using different combinations of a symbol domain and a subcarrier domain.

According to a third aspect, an embodiment of the present invention provides a system for controlling phase synchronization, including: at least two adjacent base stations, and the central controller CC in any one of the second aspect, or the first to the fifth possible implementation manners of the second aspect, where the CC is configured to exchange information with the at least two adjacent base stations.

According to the method and system for controlling phase synchronization, and the apparatus that are provided in the present invention, a path from a non-reference base station to a preset reference base station is determined, a first phase difference between every two adjacent base stations on the path is obtained, a second phase difference between the reference base station and the non-reference base station is obtained according to the first phase difference, and a non-reference phase of the non-reference base station is adjusted to a reference phase of the reference base station according to the obtained second phase difference. Therefore, in a single-frequency network system, phases of base stations are synchronized without a need to install a GPS antenna, so that system costs are reduced.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
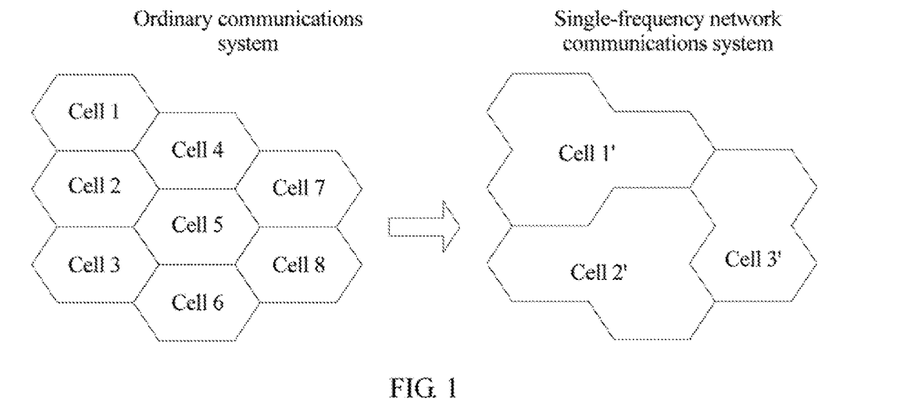
FIG. 1 is a schematic diagram of an application scenario of a method for controlling phase synchronization in the present invention.

FIG. 1 is a schematic diagram of an application scenario of a method for controlling phase synchronization in the present invention. As shown in FIG. 1, an ordinary communications system generally includes multiple different cells, and a specific cell quantity is not specially limited in the present invention. In an example of this embodiment, there are eight cells and one base station is one cell. The eight different cells are separately: a cell 1, a cell 2, . . . , and a cell 8, that is, there are eight different base stations in a communications system, and signals sent by the base stations are mutually different. Because UE receives only a wanted signal sent by a serving base station, and a signal sent by another base station is an interference signal for the UE, UE on a base station edge is interfered by multiple base stations at the same time. Therefore, signal quality of the base station edge is extremely poor. Generally, to improve the signal quality of the base station edge and to expand a signal coverage area, several base stations simultaneously transmit same signals on a same frequency band in a specific geographic area. Therefore, a single-frequency network communications system may be formed by combining cells in the ordinary communications system. For example, if base stations to which the cell 1, the cell 2, and the cell 4 belong transmit same signals, the cell 1, the cell 2, and the cell 4 may be combined into a cell 1', and a manner of combining other cells is similar. In the single-frequency network communications system, because all base stations send same cell signals, UE on each base station edge receives wanted signals of multiple base stations at the same time. Therefore, signal quality of the base station edge can be improved, and a user throughput rate can be improved. It can be learned that, in the single-frequency network communications system, how to synchronize signal phases of base stations is a problem of great importance.

Figure 2:
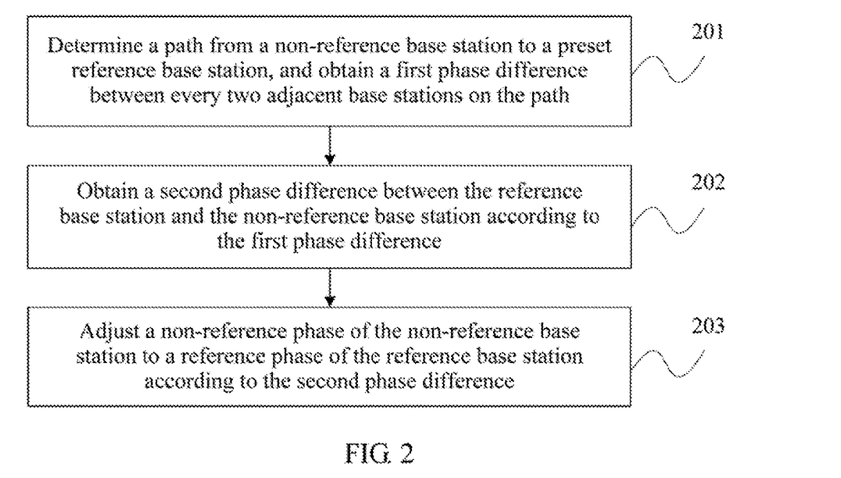
FIG. 2 is a schematic flowchart of a method for controlling phase synchronization according to an embodiment of the present invention.

FIG. 2 is a schematic flowchart of a method for controlling phase synchronization according to an embodiment of the present invention. This embodiment of the present invention provides the method for controlling phase synchronization. The method is performed by a central controller (CC), and the CC can exchange information with each base station. As shown in FIG. 2, the method in this embodiment may include the following steps.

Step 201: Determine a path from a non-reference base station to a preset reference base station, and obtain a first phase difference between every two adjacent base stations on the path.

In this embodiment, first, a reference base station is preset, and a path from each non-reference base station to the reference base station is obtained. If it is learned that a non-reference base station cannot reach the reference base station, it means that the non-reference base station is an isolated station. An application scenario in this embodiment is a case in which all base stations can reach the reference base station.

Figure 3:
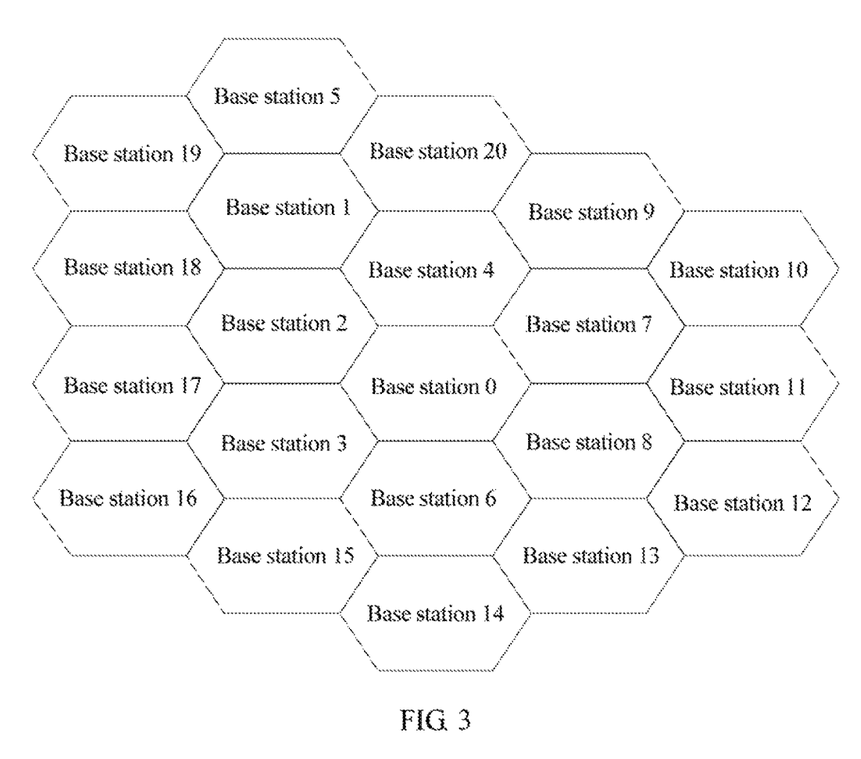
FIG. 3 is a schematic structural diagram of a single-frequency network communications system.

FIG. 3 is a schematic structural diagram of a single-frequency network communications system. As shown in FIG. 3, there are multiple base stations in the single-frequency network communications system. First, a base station 0 is used as a reference base station, and other base stations are all non-reference base stations. There may be multiple paths from any non-reference base station to the base station 0. For example, a path from a base station 1 to the base station 0 may be: the base station 1→a base station 2→the base station 0, the base station 1→a base station 4→the base station 0, the base station 1→a base station 20→the base station 4→the base station 0, or the like. In a specific implementation process, a shortest path is usually selected from multiple paths as a path from the non-reference base station to the reference base station. In addition, a manner for obtaining a path from another non-reference base station to the base station 0 is similar to a manner for obtaining the path from the base station 1 to the base station 0, and details are not described herein. A quantity of base stations on a path and path selection are not specially limited herein in the present invention.

Specifically, the first phase difference between all adjacent base stations on the path is obtained after the path from the non-reference base station to the reference base station is determined. For example, after it is determined that the path from the base station 1 to the base station 0 is the base station 1→the base station 2→the base station 0, a first phase difference between the base station 1 and the base station 2 and a first phase difference between the base station 2 and the base station 0 may be obtained.

It should be noted that the foregoing method for obtaining the first phase difference between every two adjacent base stations is also applicable when there is only one non-reference base station on the path from the non-reference base station to the reference base station, or when there are more than two non-reference base stations. A specific obtaining manner is similar to a manner of obtaining the first phase difference when there are two non-reference base stations on the path, and details are not described herein.

Step 202: Obtain a second phase difference between the reference base station and the non-reference base station according to the first phase difference.

In this embodiment, for any non-reference base station, after a path from the non-reference base station to the reference base station is determined, a second phase difference between the non-reference base station and the reference base station may be obtained according to a first phase difference between every two adjacent base stations on the path. For example, after the first phase difference between the base station 1 and the base station 2 and the first phase difference between the base station 2 and the base station 0 are obtained, a second phase difference between the base station 0 and the base station 1 may be learned.

It should be noted that after the path from the non-reference base station to the reference base station is determined, when there is only one non-reference base station on the path, that is, there is only one first phase difference, or there are more than two non-reference base stations, that is, there are more than two first phase differences, a method for obtaining the second phase difference between the reference base station and the non-reference base station according to the first phase difference is similar to a method for obtaining the second phase difference according to two first phase differences, and details are not described herein.

Step 203: Adjust a non-reference phase of the non-reference base station to a reference phase of the reference base station according to the second phase difference.

Specifically, a non-reference phase of any non-reference base station is adjusted to be consistent with the reference phase of the reference base station according to an obtained second phase difference between the non-reference base station and the reference base station and by using the reference phase of the reference base station as a criterion, so as to synchronize phases of base stations. For example, after the second phase difference between the base station 0 and the base station 1 is learned, a phase of the base station 1 is adjusted according to a phase of the base station 0, so that the phase of the base station 1 is consistent with the phase of the base station 0. Therefore, phases of base stations are synchronized.

According to the method for controlling phase synchronization provided in this embodiment of the present invention, a path from a non-reference base station to a preset reference base station is determined, a first phase difference between every two adjacent base stations on the path is obtained, a second phase difference between the reference base station and the non-reference base station is obtained according to the first phase difference, and a non-reference phase of the non-reference base station is adjusted to a reference phase of the reference base station according to the obtained second phase difference. Therefore, in a single-frequency network system, phases of base stations are synchronized without a need to install a GPS antenna, so that system costs are reduced.

Figure 4:
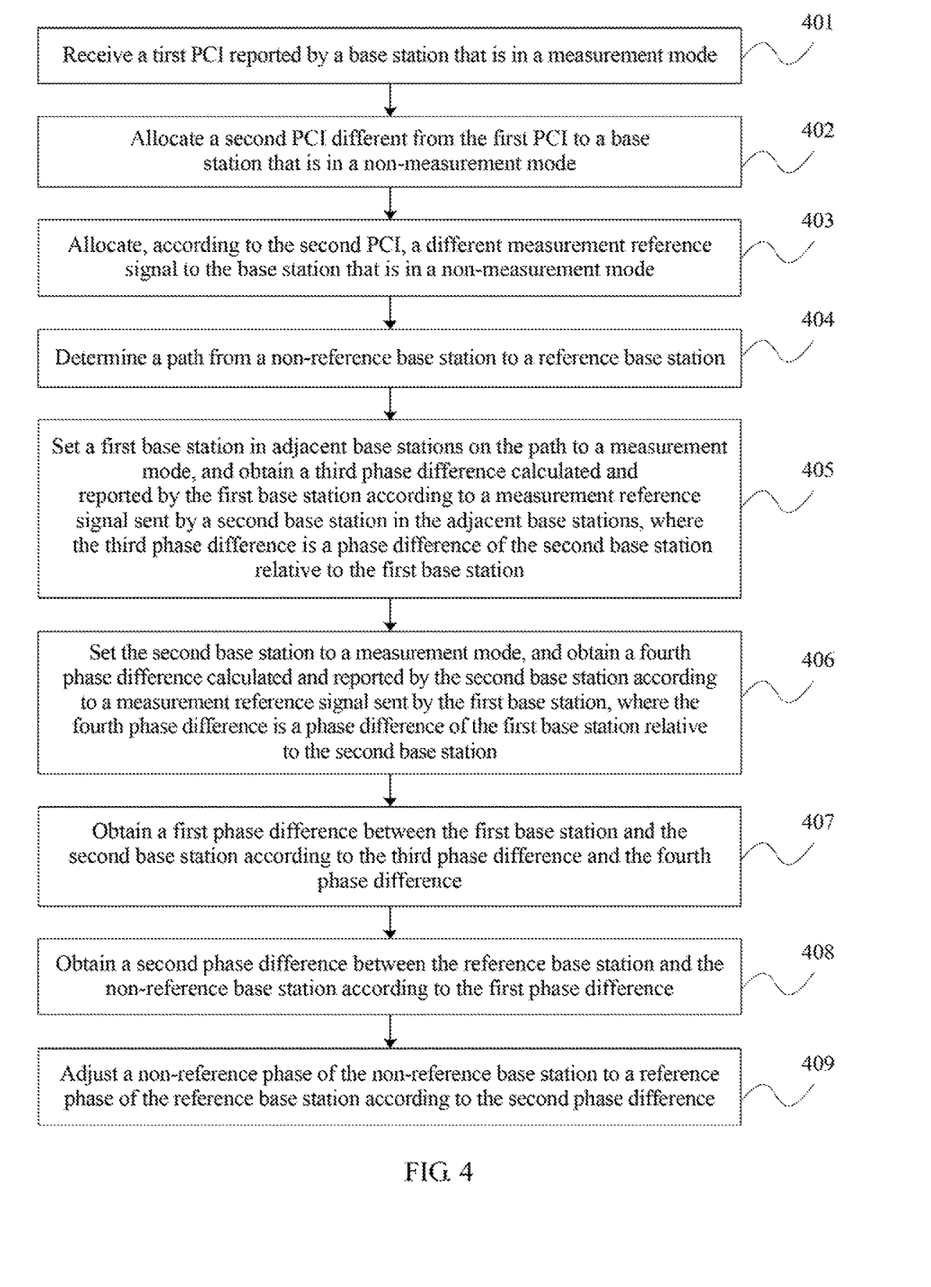
FIG. 4 is a schematic flowchart of a method for controlling phase synchronization according to another embodiment of the present invention.

FIG. 4 is a schematic flowchart of a method for controlling phase synchronization according to another embodiment of the present invention. This embodiment of the present invention provides the method for controlling phase synchronization. As shown in FIG. 4, the method in this embodiment may include the following steps.

Step 401: Receive a first PCI reported by a base station that is in a measurement mode.

In this step, a CC sets each base station that can be controlled by the CC to a measurement mode. In this case, the base station in a measurement mode may detect a cell signal of another base station that is in a non-measurement mode, and report, to the CC, a detected physical cell identifier (PCI) of the another base station that is in a non-measurement mode. The non-measurement mode in this embodiment is a normal working mode, and a base station in a normal working mode can send a downlink signal and receive an uplink signal.

Step 402: Allocate a second PCI different from the first PCI to a base station that is in a non-measurement mode.

A value range of the PCI is from 0 to 503, and the PCI is used to distinguish signals of cells from different Long Term Evolution (LTE) systems. In this embodiment, the PCI may be used to distinguish different base stations. After receiving the first PCI reported by the base station that is in a measurement mode, the CC sets each base station that can be controlled by the CC to a non-measurement mode, and the CC allocates the second PCI different from the first PCI to the base station that is in a non-measurement mode, so as to distinguish all base stations.

Step 403: Allocate, according to the second PCI, a different measurement reference signal to the base station that is in a non-measurement mode.

In this embodiment, because the CC allocates a corresponding second PCI to each base station that is in a non-measurement mode, and allocates a measurement reference signal in one-to-one correspondence with the second PCI to the base station that is in a non-measurement mode, a base station that sends the measurement reference signal is identified.

Specifically, different combinations of a symbol domain and a subcarrier domain are generally used to generate different measurement reference signals, to avoid mutual interference between signals of different base stations. Persons skilled in the art may understand that the measurement reference signal is obtained by offsetting the symbol domain and the subcarrier domain based on a cell reference signal (CRS) corresponding to a cell. A single-antenna port and a dual-antenna port are mainly used as examples for description in the following.

Figure 5:
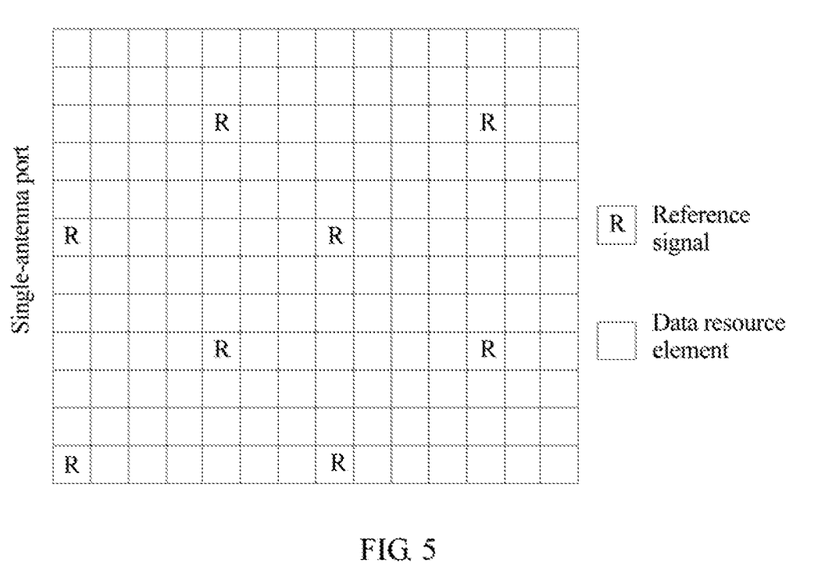
FIG. 5 is a resource element pattern of a CRS of a single-antenna port.
Figure 6:
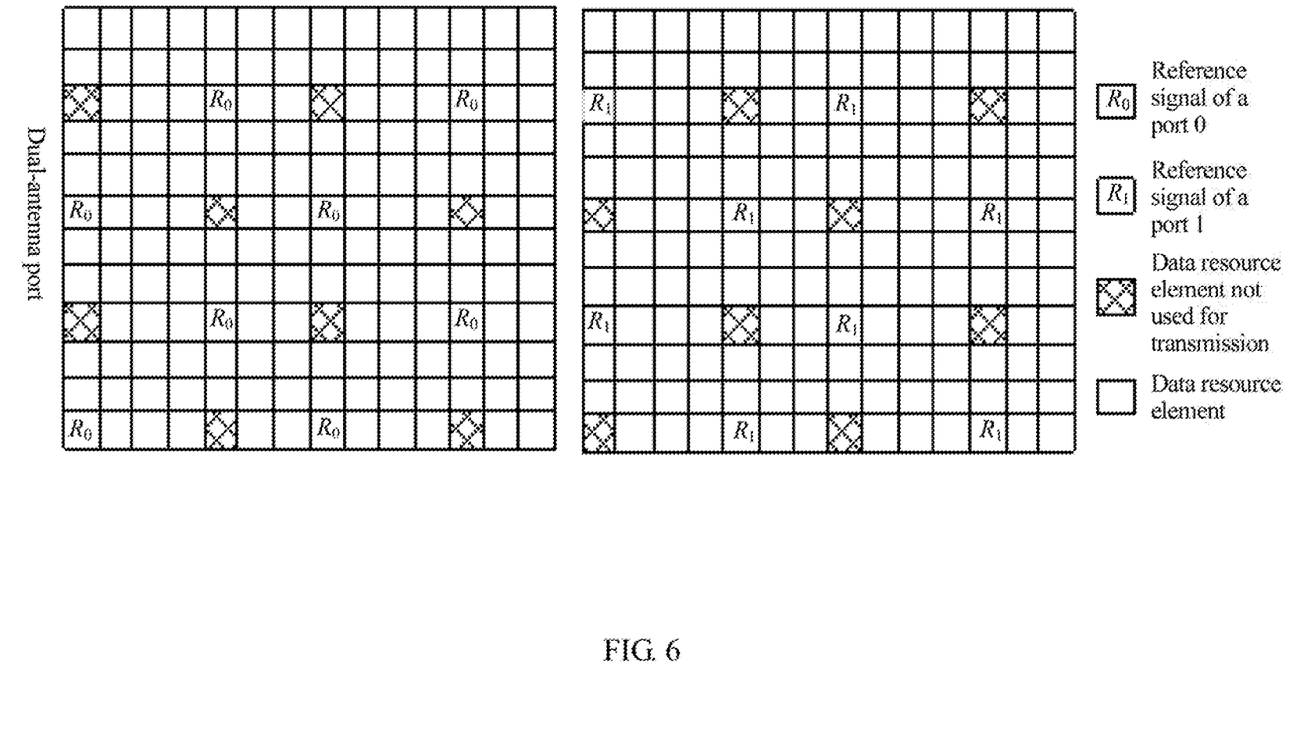
FIG. 6 is a resource element pattern of a CRS of a dual-antenna port.

FIG. 5 is a resource element pattern of a CRS of a single-antenna port, and FIG. 6 is a resource element pattern of a CRS of a dual-antenna port. As shown in FIG. 5 and FIG. 6, the horizontal axis represents the symbol domain, and the vertical axis represents the subcarrier domain. For the single-antenna port, a reference signal (RS) has seven offsets in the symbol domain and three offsets in the subcarrier domain. Therefore, there are totally 21 patterns for generated measurement reference signals in a single-antenna port case. In addition, the generated measurement reference signals are numbered as, for example, 1, 2, 3, . . . , and the numbers are referred to as a measurement reference signal identity (MRSid). For the dual-antenna port, an $RS_0$ and an $RS_1$ each have seven offsets in the symbol domain, and each have three offsets in the subcarrier domain. Therefore, there are also 21 patterns for generated measurement reference signals in a dual-antenna port case. Likewise, the generated measurement reference signals are numbered to obtain an MRSid for the dual-antenna port. After offsets of an RS in the symbol domain and the subcarrier domain are obtained, MRSid=Offset in the subcarrier domain×7+Offset in the symbol domain.

Persons skilled in the art may understand that when a time offset between base stations is excessively large, for example, reaches one symbol, different measurement reference signals are overlapped in the symbol domain. In this case, an offset in the symbol domain may be put into a gold sequence generation formula, to distinguish measurement reference signals corresponding to different offsets in the symbol domain. In a specific implementation process, formula (1.1) may be used for implementation.

$$C'_{int}=2^{10}*(7*(n_s+1)+l+1)*(2*N_{ID}^{cell}+1)+2*N_{ID}^{cell}+N_{CP}+(\text{MRSid mod } 7) \quad (1.1),$$

where $C_{int}$ is a cyclic shift register initial value of a sequence parameter, $n_s$ is a timeslot number, l is a time domain number, $N_{ID}^{cell}$ is a cell ID, and $N_{CP}$, is a cyclic prefix. For a specific meaning of the parameter, reference may be made to a formula in 6.10.1.1 of the 36.211 protocol in the 3rd Generation Partnership Project (3GPP).

Step 404: Determine a path from a non-reference base station to a reference base station.

Step 405: Set a first base station in adjacent base stations on the path to a measurement mode, and obtain a third phase difference calculated and reported by the first base station according to a measurement reference signal sent by a second base station in the adjacent base stations, where the third phase difference is a phase difference of the second base station relative to the first base station.

In this step, the first base station and the second base station form a neighboring-station pair. A CC sets the first base station to a measurement mode, and sets the second base station to a non-measurement mode, that is, a normal working mode. In this case, the first base station may receive the measurement reference signal sent by the second base station, and the first base station compares the received measurement reference signal with a measurement reference signal to be sent by the first base station, so that the third phase difference T1 of the second base station relative to the first base station may be obtained. The third phase difference T1 is a difference of a phase of the measurement reference signal of the first base station minus a phase of the measurement reference signal of the second base station. It should be noted that the third phase difference includes a phase delay (Delay) between the first base station and the second base station.

Step 406: Set the second base station to a measurement mode, and obtain a fourth phase difference calculated and reported by the second base station according to a measurement reference signal sent by the first base station, where the fourth phase difference is a phase difference of the first base station relative to the second base station.

In this step, the second base station is set to a measurement mode, and the first base station is set to a non-measurement mode, so as to obtain the fourth phase difference T2 of the first base station relative to the second base station. The fourth phase difference T2 is a difference of the phase of the measurement reference signal of the second base station minus the phase of the measurement reference signal of the first second base station. Likewise, the fourth phase difference includes the phase delay Delay between the first base station and the second base station.

Step 407: Obtain a first phase difference between the first base station and the second base station according to the third phase difference and the fourth phase difference.

Specifically, if a signal phase offset of the first base station is I1, and a signal phase offset of the second base station is I2, the following formulas may be obtained according to the phase difference T1 of the second base station relative to the first base station and the phase difference T2 of the first base station relative to the second base station.

$$I2+Delay-I2=T1 \quad (1.2)$$

$$I1+Delay-I2=T2 \quad (1.3)$$

The first phase difference T3 between the first base station and the second base station and the phase Delay Jay between the first base station and the second base station may be obtained according to formula (1.2) and formula (1.3).

$$Delay=(T1+T2)/2 \quad (1.4)$$

$$T3=I2-I1=(T1-T2)/2 \quad (1.5)$$

Impact exerted by the inter-station phase delay on synchronization precision may be compensated by obtaining Delay.

Step 408: Obtain a second phase difference between the reference base station and the non-reference base station according to the first phase difference.

In this step, for any non-reference base station, after a path from the non-reference base station to the reference base station is determined, a second phase difference between the non-reference base station and the reference base station may be obtained according to a first phase difference between every two adjacent base stations on the path.

Step 409: Adjust a non-reference phase of the non-reference base station to a reference phase of the reference base station according to the second phase difference.

Step 409 is similar to step 103, and details are not described herein.

According to the method for controlling phase synchronization provided in this embodiment of the present invention, a path from a non-reference base station to a preset reference base station is determined, a first phase difference between every two adjacent base stations on the path is obtained, a second phase difference between the reference base station and the non-reference base station is obtained according to the first phase difference, and a non-reference phase of the non-reference base station is adjusted to a reference phase of the reference base station according to the obtained second phase difference. Therefore, in a single-frequency network system, phases of base stations are synchronized without a need to install a GPS antenna, so that system costs are reduced.

Figure 7:
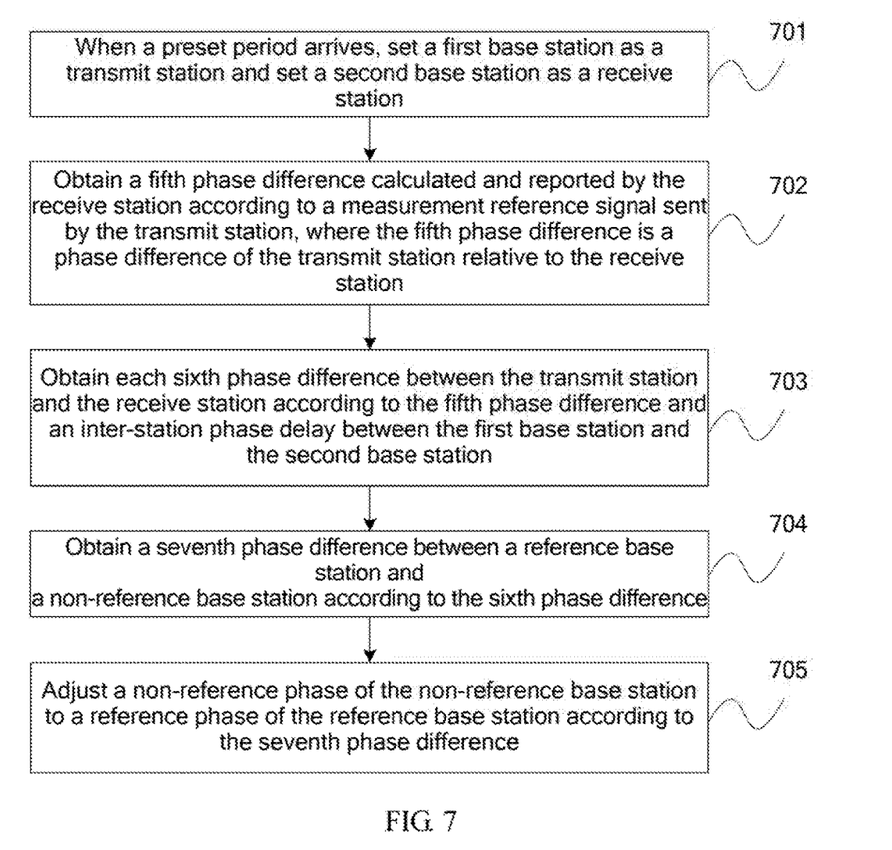
FIG. 7 is a schematic flowchart of a method for controlling phase synchronization according to still another embodiment of the present invention.

FIG. 7 is a schematic flowchart of a method for controlling phase synchronization according to still another embodiment of the present invention. This embodiment of the present invention provides the method for controlling phase synchronization. Based on the foregoing embodiments, this embodiment describes in detail an embodiment after a non-reference phase of a non-reference base station is adjusted to a reference phase of a reference base station. As shown in FIG. 7, the method in this embodiment may include the following steps.

Step 701: When a preset period arrives, set a first base station as a transmit station and set a second base station as a receive station.

In this embodiment, after phases of base stations are synchronized, a phase difference may appear between the base stations after a period of time because of impact of the base stations or an external factor. Therefore, phases need to be tracked and synchronized.

Specifically, persons skilled in the art may understand that a signal is transmitted between base stations by using a radio frame, a period of a radio frame is 10 ms, and the radio frame includes 10 subframes. A preset period may be set after the base station works normally. When the preset period arrives, a subframe in the radio frame is selected as a measurement reference signal, and other subframes are normal working subframes. For example, a time of 1 ms is selected from the preset period for phase tracking and synchronization. Because only one subframe in the radio frame is occupied in tracking and synchronization in such manner, impact on normal signal transmission can be reduced as far as possible. The preset period may be 15 s, 16 s, or the like according to an actual need. In a specific implementation process, an appropriate preset period may be selected according to experience or a quantity of base stations. For example, when base stations are in a relatively large quantity, 16 s is selected, or base stations are in a relatively small quantity, 15 s is selected. Selection of a specific value of the preset period is not specially limited herein in this embodiment.

When the preset period arrives, a first base station in adjacent base stations is set as the transmit station and a second base station is set as the receive station. In addition, the transmit station and the receive station may be set according to the following rules: (1) A reference base station is fixed as the transmit station. (2) For any transmit station, at least one receive station is set from adjacent base stations of the transmit station to receive a signal transmitted by the transmit station. (3) For any receive station, at least two transmit stations are included in adjacent base stations of the receive station. Specific setting of the transmit station and the receive station is not specially limited in this embodiment.

Step 702: Obtain a fifth phase difference calculated and reported by the receive station according to a measurement reference signal sent by the transmit station, where the fifth phase difference is a phase difference of the transmit station relative to the receive station.

In this step, the receive station receives the measurement reference signal sent by the transmit station, and compares a phase of the received measurement reference signal with a phase of a signal to be sent by the receive station, and calculates the fifth phase difference 14 of the transmit station relative to the receive station.

Step 703: Obtain each sixth phase difference between the transmit station and the receive station according to the fifth phase difference and an inter-station phase delay between the first base station and the second base station.

Specifically, the sixth phase difference T5 between the transmit station and the receive station is obtained according to the fifth phase difference T4 of the transmit station relative to the receive station and the phase delay, obtained in step 407, between the first base station and the second base station, that is, a phase delay Delay between the transmit station and the receive station. In a specific implementation process, the sixth phase difference may be obtained by means of calculation according to a formula T5=T4−Delay.

It should be noted that the sixth phase difference T5 between the transmit station and the receive station may be obtained according to the phase difference of the transmit station relative to the receive station and a phase difference of the receive station relative to the transmit station. However, in an actual application process, generally, only 1 ms is selected from the preset period for the phase tracking and synchronization, so that normal signal transmission is not affected. If the sixth phase difference is obtained according to the phase difference of the transmit station relative to the receive station and the phase difference of the receive station relative to the transmit station, calculation needs to be performed multiple times. In this case, there may be a phenomenon that phases are not synchronized after 1 ms. Therefore, in phase tracking and synchronization, preferably, the sixth phase difference between the transmit station and the receive station is calculated according to the phase difference of the transmit station relative to the receive station and the inter-station phase delay.

Step 704: Obtain a seventh phase difference between a reference base station and a non-reference base station according to the sixth phase difference.

In this embodiment, because the transmit station and the receive station are adjacent base stations, after the sixth phase difference between the transmit station and the receive station is obtained, a seventh phase difference between the reference base station and any non-reference base station may be obtained. For example, in FIG. 3, a base station 0 is preset as the reference base station, and according to the rules for setting the transmit station and the receive station, the base station 0 and a base station 1 are set as transmit stations, and a base station 4 is set as a receive station. After a sixth phase difference between the base station 1 and the base station 4 and a sixth phase difference between the base station 4 and the base station 0 are obtained, a seventh phase difference between the base station 0 and the base station 1 may be learned.

Step 705: Adjust a non-reference phase of the non-reference base station to a reference phase of the reference base station according to the seventh phase difference.

Specifically, after a sixth phase difference between any non-reference base station and the reference base station is obtained, a non-reference phase of the non-reference base station is adjusted to be consistent with the reference phase of the reference base station by using the reference phase of the reference base station as a criterion, so that phases of base stations are tracked and synchronized.

According to the method for controlling phase synchronization provided in this embodiment of the present invention, after a preset period arrives, each sixth phase difference between a transmit station and a receive station is obtained according to a phase difference of the transmit station relative to the receive station and an inter-station phase delay, a seventh phase difference between a reference base station and a non-reference base station may be obtained according to the sixth phase difference, and a non-reference phase of the non-reference base station is adjusted to a reference phase of the reference base station according to the seventh phase difference. Therefore, phases are tracked and synchronized, and synchronization precision is improved.

Figure 8:
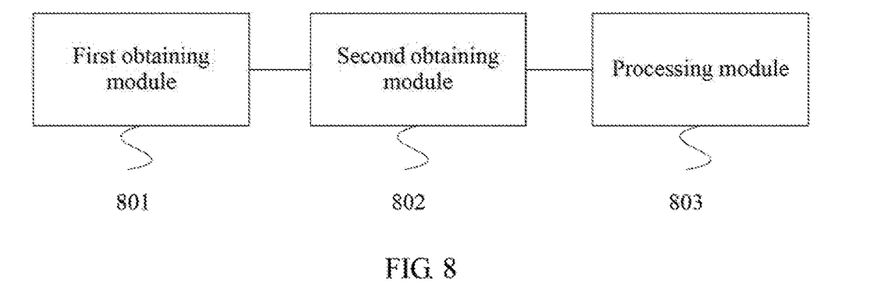
FIG. 8 is a schematic structural diagram of a central controller according to an embodiment of the present invention.

FIG. 8 is a schematic structural diagram of a central controller according to an embodiment of the present invention. As shown in FIG. 8, the central controller provided in this embodiment of the present invention includes a first obtaining module 801, a second obtaining module 802, and a processing module 803.

The first obtaining module 801 is configured to: determine a path from a non-reference base station to a preset reference base station, and obtain a first phase difference between every two adjacent base stations on the path. The second obtaining module 802 is configured to obtain a second phase difference between the reference base station and the non-reference base station according to the first phase difference. The processing module 803 is configured to adjust a non-reference phase of the non-reference base station to a reference phase of the reference base station according to the second phase difference.

According to the central controller provided in this embodiment of the present invention, a path from a non-reference base station to a preset reference base station is determined, a first phase difference between every two adjacent base stations on the path is obtained, a second phase difference between the reference base station and the non-reference base station is obtained according to the first phase difference, and a non-reference phase of the non-reference base station is adjusted to a reference phase of the reference base station according to the obtained second phase difference. Therefore, in a single-frequency network system, phases of base stations are synchronized without a need to install a GPS antenna, so that system costs are reduced.

Figure 9:
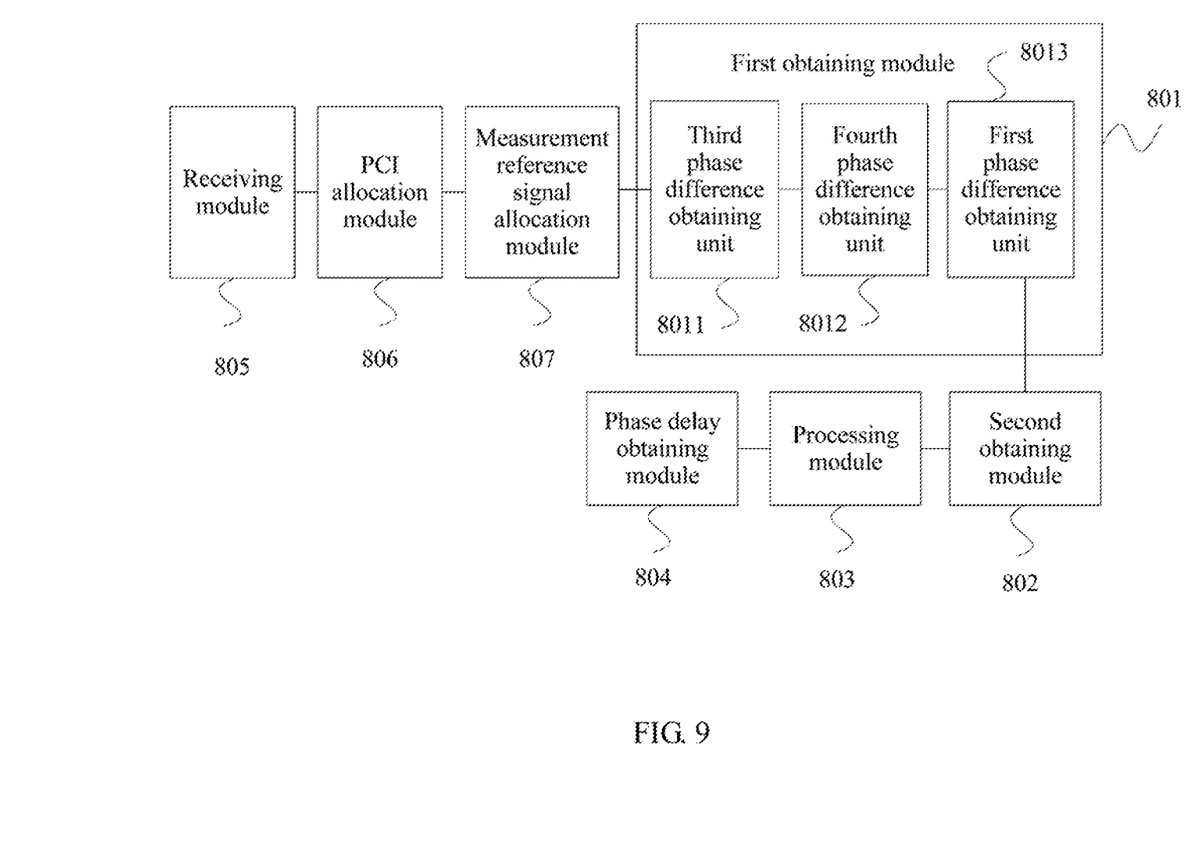
FIG. 9 is a schematic structural diagram of a central controller according to another embodiment of the present invention.

FIG. 9 is a schematic structural diagram of a central controller according to another embodiment of the present invention. As shown in FIG. 9, this embodiment is based on the embodiment shown in FIG. 8, and the first obtaining module 801 includes: a third phase difference obtaining unit 8011, a fourth phase difference obtaining unit 8012, and a first phase difference obtaining unit 8013.

The third phase difference obtaining unit 8011 is configured to: set a first base station in the adjacent base stations on the path to a measurement mode, and obtain a third phase difference calculated and reported by the first base station according to a measurement reference signal sent by a second base station in the adjacent base stations, where the third phase difference is a phase difference of the second base station relative to the first base station. The fourth phase difference obtaining unit 8012 is configured to: set the second base station to a measurement mode, and obtain a fourth phase difference calculated and reported by the second base station according to a measurement reference signal sent by the first base station, where the fourth phase difference is a phase difference of the first base station relative to the second base station. The first phase difference obtaining unit 8013 is configured to obtain a first phase difference between the first base station and the second base station according to the third phase difference and the fourth phase difference.

Optionally, the central controller further includes a phase delay obtaining module 804. The phase delay obtaining module 804 is configured to obtain an inter-station phase delay between the first base station and the second base station according to the third phase difference and the fourth phase difference.

Optionally, the central controller further includes a receiving module 805, a PCI allocation module 806, and a measurement reference signal allocation module 807.

The receiving module 805 is configured to receive a first physical cell identifier (PCI) reported by a base station that is in a measurement mode. The PCI allocation module 806 is configured to allocate a second PCI different from the first PCI to a base station that is in a non-measurement mode. The measurement reference signal allocation module 807 is configured to allocate, according to the second PCI, a different measurement reference signal to the base station that is in a non-measurement mode.

According to the central controller provided in this embodiment of the present invention, a path from a non-reference base station to a preset reference base station is determined, a first phase difference between every two adjacent base stations on the path is obtained, a second phase difference between the reference base station and the non-reference base station is obtained according to the first phase difference, and a non-reference phase of the non-reference base station is adjusted to a reference phase of the reference base station according to the obtained second phase difference. Therefore, in a single-frequency network system, phases of base stations are synchronized without a need to install a OPS antenna, so that system costs are reduced.

Figure 10:
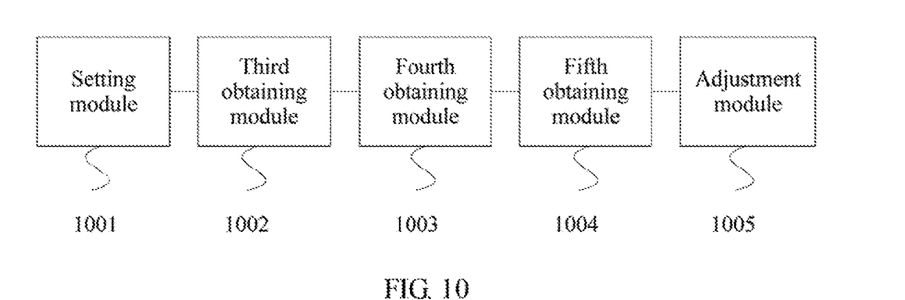
FIG. 10 is a schematic structural diagram of a central controller according to still another embodiment of the present invention.

FIG. 10 is a schematic structural diagram of a central controller according to still another embodiment of the present invention. As shown in FIG. 10, this embodiment is based on the foregoing embodiments, and the central controller further includes: a setting module 1001, a third obtaining module 1002, a fourth obtaining module 1003, a fifth obtaining module 1004, and an adjustment module 1005.

The setting module 1001 is configured to: when a preset period arrives, set the first base station as a transmit station and set the second base station as a receive station. The third obtaining module 1002 is configured to obtain a fifth phase difference calculated and reported by the receive station according to a measurement reference signal sent by the transmit station, where the fifth phase difference is a phase difference of the transmit station relative to the receive station. The fourth obtaining module 1003 is configured to obtain each sixth phase difference between the transmit station and the receive station according to the fifth phase difference and the inter-station phase delay between the first base station and the second base station. The fifth obtaining module 1004 is configured to obtain a seventh phase difference between the reference base station and the non-reference base station according to each sixth phase difference. The adjustment module 1005 is configured to adjust the non-reference phase of the non-reference base station to the reference phase of the reference base station according to the seventh phase difference.

According to the central controller provided in this embodiment of the present invention, after a preset period arrives, each sixth phase difference between a transmit station and a receive station is obtained according to a phase difference of the transmit station relative to the receive station and an inter-station phase delay, a seventh phase difference between a reference base station and a non-reference base station may be obtained according to the sixth phase difference, and a non-reference phase of the non-reference base station is adjusted to a reference phase of the reference base station according to the seventh phase difference. Therefore, phases are tracked and synchronized, and synchronization precision is improved.

Figure 11:
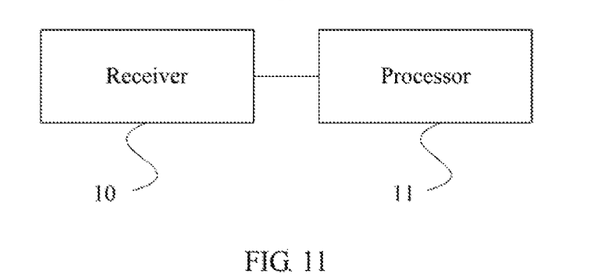
FIG. 11 is a schematic structural diagram of a central controller according to yet another embodiment of the present invention.

FIG. 11 is a schematic structural diagram of a central controller according to yet another embodiment of the present invention. As shown in FIG. 11, the central controller provided in this embodiment of the present invention includes: a receiver 10 and a processor 11.

The receiver 10 is configured to: determine a path from a non-reference base station to a preset reference base station, and obtain a first phase difference between every two adjacent base stations on the path. The receiver 10 is further configured to obtain a second phase difference between the reference base station and the non-reference base station according to the first phase difference. The processor 11 is configured to adjust a non-reference phase of the non-reference base station to a reference phase of the reference base station according to the second phase difference.

The central controller provided in this embodiment of the present invention can perform technical solutions of the foregoing method for controlling phase synchronization. Implementation principles and technical effects thereof are similar, and details are not described herein.

In this embodiment of the present invention, the receiver 10 is specifically configured to: set a first base station in the adjacent base stations on the path to a measurement mode, and obtain a third phase difference calculated and reported by the first base station according to a measurement reference signal sent by a second base station in the adjacent base stations, where the third phase difference is a phase difference of the second base station relative to the first base station; and set the second base station to a measurement mode, and obtain a fourth phase difference calculated and reported by the second base station according to a measurement reference signal sent by the first base station, where the fourth phase difference is a phase difference of the first base station relative to the second base station. The processor 11 is specifically configured to obtain a first phase difference between the first base station and the second base station according to the third phase difference and the fourth phase difference.

The central controller provided in this embodiment of the present invention can perform technical solutions of the foregoing method for controlling phase synchronization. Implementation principles and technical effects thereof are similar, and details are not described herein.

In this embodiment of the present invention, the receiver 10 is specifically configured to obtain an inter-station phase delay between the first base station and the second base station according to the third phase difference and the fourth phase difference.

Further, the receiver 10 is specifically configured to receive a first physical cell identifier (PCI) reported by a base station that is in a measurement mode. The processor 11 is specifically configured to: allocate a second PCI different from the first PCI to a base station that is in a non-measurement mode, and allocate, according to the second PCI, a different measurement reference signal to the base station that is in a non-measurement mode.

The central controller provided in this embodiment of the present invention can perform technical solutions of the foregoing method for controlling phase synchronization. Implementation principles and technical effects thereof are similar, and details are not described herein.

In this embodiment of the present invention, the processor 11 is specifically configured to: when a preset period arrives, set the first base station as a transmit station and set the second base station as a receive station. The receiver 10 is specifically configured to obtain a fifth phase difference calculated and reported by the receive station according to a measurement reference signal sent by the transmit station, where the fifth phase difference is a phase difference of the transmit station relative to the receive station. The processor 11 is specifically configured to: obtain each sixth phase difference between the transmit station and the receive station according to the fifth phase difference and the inter-station phase delay between the first base station and the second base station, and obtain a seventh phase difference between the reference base station and the non-reference base station according to each sixth phase difference. The processor 11 is further configured to adjust the non-reference phase of the non-reference base station to the reference phase of the reference base station according to the seventh phase difference.

The central controller provided in this embodiment of the present invention can perform technical solutions of the foregoing method for controlling phase synchronization. Implementation principles and technical effects thereof are similar, and details are not described herein.

Figure 12:
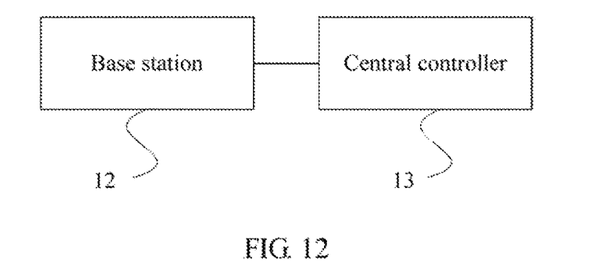
FIG. 12 is a schematic structural diagram of an embodiment of a system for controlling phase synchronization in the present invention.

FIG. 12 is a schematic structural diagram of an embodiment of a system for controlling phase synchronization. As shown in FIG. 12, the system includes: at least two adjacent base stations 12, and a central controller 13. There are at least two base stations 12 that are set to be neighboring to each other, and the central controller 13 is configured to exchange information with the at least two adjacent base stations 12. The central controller involved in this embodiment of the system for controlling phase synchronization may be the central controller provided in the foregoing apparatus embodiments, and a specific structure and a specific function of the system are not described herein.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor (processor) to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of the present application, but not for limiting the present application. Although the present application is described in detail with reference to the foregoing embodiments, persons of ordinary skill in the an should understand that they may still make modifications to the technical solutions described in the foregoing embodiments or make equivalent replacements to some technical features thereof, without departing from the scope of the technical solutions of the embodiments of the present application.

What is claimed is:

1. A method for controlling phase synchronization, comprising:
   receiving a first physical cell identifier (PCI) reported by a base station that is in a measurement mode;
   allocating a second PCI different from the first PCI to a base station that is in a non-measurement mode;
   allocating, according to the second PCI, a different measurement reference signal to the base station that is in the non-measurement mode;
   determining a path from a non-reference base station to a preset reference base station, and obtaining a first phase difference between every two adjacent base stations on the path by using different measurement reference signals;

obtaining a second phase difference between the preset reference base station and the non-reference base station according to the first phase difference; and adjusting a non-reference phase of the non-reference base station to a reference phase of the preset reference base station according to the second phase difference.

2. The method according to claim 1, wherein the obtaining the first phase difference between every two adjacent base stations on the path comprises:

setting a first base station in the adjacent base stations on the path to the measurement mode, and obtaining a third phase difference calculated and reported by the first base station according to a measurement reference signal sent by a second base station in the adjacent base stations, wherein the third phase difference is a phase difference of the second base station relative to the first base station;

setting the second base station to the measurement mode, and obtaining a fourth phase difference calculated and reported by the second base station according to a measurement reference signal sent by the first base station, wherein the fourth phase difference is a phase difference of the first base station relative to the second base station; and obtaining a first phase difference between the first base station and the second base station according to the third phase difference and the fourth phase difference.

3. The method according to claim 2, wherein the method further comprises:

obtaining an inter-station phase delay between the first base station and the second base station according to the third phase difference and the fourth phase difference.

4. The method according to claim 3, wherein the method further comprises:

in response to an arrival of a present period, setting the first base station as a transmit station and setting the second base station as a receive station;

obtaining a fifth phase difference calculated and reported by the receive station according to a measurement reference signal sent by the transmit station, wherein the fifth phase difference is a phase difference of the transmit station relative to the receive station;

obtaining each sixth phase difference between the transmit station and the receive station according to the fifth phase difference and the inter-station phase delay between the first base station and the second base station;

obtaining a seventh phase difference between the preset reference base station and the non-reference base station according to each sixth phase difference; and adjusting the non-reference phase of the non-reference base station to the reference phase of the preset reference base station according to the seventh phase difference.

5. The method according to claim 1, wherein the measurement reference signal is obtained by using different combinations of a symbol domain and a subcarrier domain.

6. A central controller, comprising:

a receiving module, configured to receive a first physical cell identifier (PCI) reported by a base station that is in a measurement mode;

a PCI allocation module, configured to allocate a second PCI different from the first PCI to a base station that is in a non-measurement mode;

a measurement reference signal allocation module, configured to allocate, according to the second PCI, a different measurement reference signal to the base station that is in the non-measurement mode;

a first obtaining module, configured to determine a path from a non-reference base station to a preset reference base station, and configured to obtain a first phase difference between every two adjacent base stations on the path by using different measurement reference signals;

a second obtaining module, in communication with the first obtaining module and configured to obtain a second phase difference between the preset reference base station and the non-reference base station according to the first phase difference; and a processor, in communication with the second obtaining module and configured to adjust a non-reference phase of the non-reference base station to a reference phase of the preset reference base station according to the second phase difference.

7. The central controller according to claim 6, wherein the first obtaining module comprises:

a third phase difference obtaining unit, configured to set a first base station in the adjacent base stations on the path to a measurement mode, and configured to obtain a third phase difference calculated and reported by the first base station according to a measurement reference signal sent by a second base station in the adjacent base stations, wherein the third phase difference is a phase difference of the second base station relative to the first base station;

a fourth phase difference obtaining unit, configured to set the second base station to the measurement mode, and configured to obtain a fourth phase difference calculated and reported by the second base station according to a measurement reference signal sent by the first base station, wherein the fourth phase difference is a phase difference of the first base station relative to the second base station; and a first phase difference obtaining unit, configured to obtain a first phase difference between the first base station and the second base station according to the third phase difference and the fourth phase difference.

8. The central controller according to claim 7, further comprising:

a phase delay obtaining module, configured to obtain an inter-station phase delay between the first base station and the second base station according to the third phase difference and the fourth phase difference.

9. The central controller according to claim 8, further comprising:

a setting module, configured to set the first base station as a transmit station and set the second base station as a receive station in response to an arrival of a preset period;

a third obtaining module, configured to obtain a fifth phase difference calculated and reported by the receive station according to a measurement reference signal sent by the transmit station, wherein the fifth phase difference is a phase difference of the transmit station relative to the receive station;

a fourth obtaining module, configured to obtain each sixth phase difference between the transmit station and the receive station according to the fifth phase difference and the inter-station phase delay between the first base station and the second base station;

a fifth obtaining module, configured to obtain a seventh phase difference between the preset reference base station and the non-reference base station according to each sixth phase difference; and an adjustment module, configured to adjust the non-reference phase of the non-reference base station to the reference phase of the preset reference base station according to the seventh phase difference.

10. The central controller according to claim 6, wherein the measurement reference signal is obtained by using different combinations of a symbol domain and a subcarrier domain.

\* \* \* \* \*